Jan. 17, 1928.

L. WETMORE 1,656,877

CEMENTING DEVICE FOR BANDS

Filed Aug. 6, 1925  2 Sheets-Sheet 1

INVENTOR
*Laurence Wetmore*
BY
ATTORNEY

Jan. 17, 1928.

L. WETMORE 1,656,877

CEMENTING DEVICE FOR BANDS

Filed Aug. 6, 1925

2 Sheets-Sheet 2

INVENTOR
*Laurence Wetmore*
BY
ATTORNEY

Patented Jan. 17, 1928.

1,656,877

UNITED STATES PATENT OFFICE.

LAURENCE WETMORE, OF AKRON, OHIO, ASSIGNOR TO THE GOODYEAR TIRE & RUBBER COMPANY, OF AKRON, OHIO, A CORPORATION OF OHIO.

CEMENTING DEVICE FOR BANDS.

Application filed August 6, 1925. Serial No. 48,653.

My invention relates to cementing machines and it has particular reference to a machine designed to apply rubber cement to rubberized fabric material.

Continuous strips or bands of rubberized fabric are employed in the construction of automobile tires. These bands are superimposed upon a mandrel, or other device, by means of which their length may be regulated. Until the assembled tire carcass is vulcanized, it is possible to tear the bands apart by hand, inasmuch as the cohesion between the rubber of the adjacent bands is not very great. Certain rubber compositions, suitable for originally coating the bands, lose their tackiness, or become dry, when exposed to the air. Bands impregnated with such compositions do not cohere sufficiently when dry to assemble properly the tire carcass. To overcome this condition, it was proposed to apply a coating of rubber cement to the bands before placing them upon each other. The fresh cement formed a tacky coating and held the bands in proper relation. This coating was applied by hand with a brush. The operation was slow, and the coating was not as uniform as desired.

Figure 1:
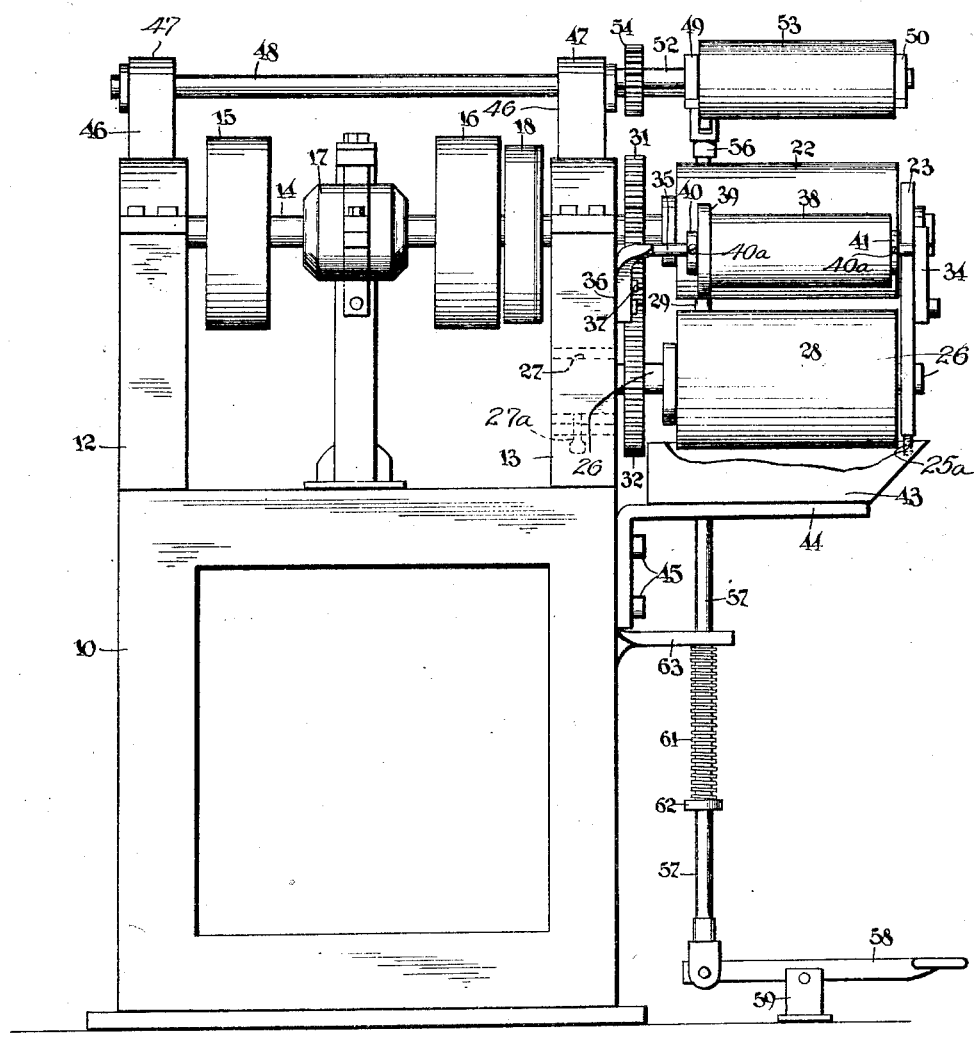
Figure 2:
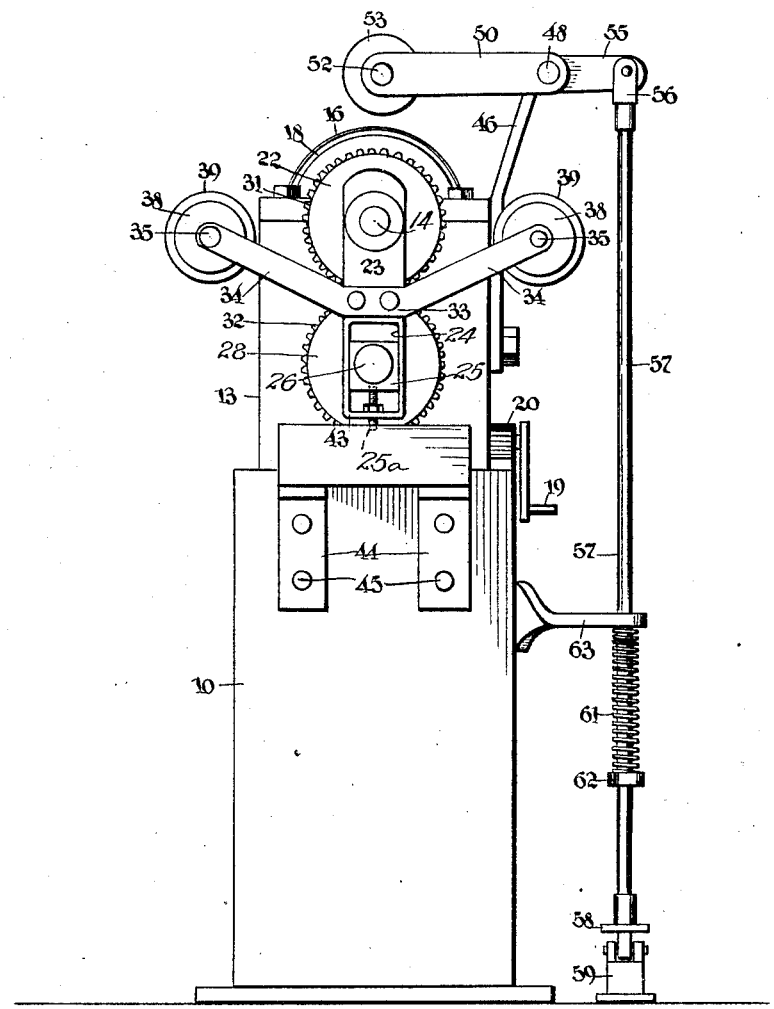

This invention has among its objects the provision of a machine to apply cement to the strips or bands of rubberized fabric. One practical embodiment of the invention is shown in the attached drawings, wherein:

Fig. 1 is a side elevational view of a machine, a portion being broken away; and Fig. 2 is an end elevational view of the machine.

The machine comprises a main bed frame 10, which may be of any suitable construction. Two pillow blocks 12 and 13, are mounted upon the frame, and have a shaft 14 journaled in them. Two driving pulleys 15 and 16, a driving clutch 17, and a brake 18, are mounted on the shaft between the pillow blocks. The pulleys are connected to a suitable source of power, not shown. Two pulleys are provided, in order that the speed of the shaft may be varied. The brake 18 may be utilized if it becomes necessary to stop the machine suddenly. The clutch 17 may be of any desired type, and the details of its construction need not be described. The clutch is operated by a hand lever 19, pivoted to the main frame 10, as indicated at 20. The lever 19 is employed to connect either pulley 15 or 16 to the shaft 14, or to disengage the drive altogether.

The shaft 14 extends beyond the frame 10 and has keyed thereto a supporting roller 22. A bearing support 23 is suspended at the extremity of the shaft 14, and has in its lower end a slot 24 in which is mounted an adjustable bearing 25. The bearing 25 is adapted to be vertically adjusted by means of a set screw 25$^a$ threaded through the lower portion of the support 23. Journaled in this bearing is a countershaft 26, the other end of which is supported in an adjustable bearing 27, mounted in a slotted portion of the pillow block 13 and vertically adjustable by means of a set screw 27$^a$. The counter shaft 26 has keyed thereto a supplying roller 28. A clearance 29 is provided between rollers 22 and 28. This clearance may be varied by adjustment of bearings 25 and 27, in the slot 24 and pillow block 13 respectively. Intermeshing gears, 31 and 32, keyed to shafts 14 and 26, respectively, insure the rotation of the roller 28 in unison with the roller 22, the teeth of these gears being of such length as to permit sufficient movement toward and away from each other, without becoming disengaged to provide for the desired adjustment between the rollers 22 and 28.

The support 23 has a bridge 33 rigidly affixed thereto. The arms 34 of the bridge 33 project upwardly and on either side of the rollers 22 and 28, as shown in Fig. 2. The end of each arm is pierced to receive a fixed shaft 35. The inner end of each shaft 35 is turned at a right angle and is flattened to form a bearing face 36 which abuts the pillow block 13. Screws 37 pass through the flattened portion of the shaft 35 and secure it to the pillow block 13. Each shaft 35 has a guide roller 38 freely mounted thereon. The inner end of each roller is enlarged to form an annular flange 39. Collars 40 and 41 secure the rollers 38 in suitable positions on the fixed shafts 35. These collars are adapted to be secured in various positions upon the shafts 35 by means of suitable fastening devices, such as set screws 40ª. It will thus be apparent that the rollers 38 are axially adjustable upon the shafts 35.

A tank or basin 43 is mounted underneath the roller 28. This basin is adapted to receive fluid rubber cement and it is held in position by brackets 44 which are secured to the main frame 10 by any suitable means, such as screws 45. The basin is sufficiently wide to permit of its removal without disturbing the roller 28 or the brackets 44.

Outwardly projecting shaft hangers 46 are secured to the pillow blocks 12 and 13. The outer ends of the hangers are enlarged to provide bearings 47, in which is mounted a shaft 48. A plurality of arms 49 and 50 are keyed to the shaft 48. The extremities of these arms are drilled to receive a shaft 52 upon which a pressure roller 53 is rotatably mounted. The inner end of the shaft 52 has a gear 54 keyed thereto, which meshes with the gear 31 on driving shaft 14, when the machine is in operation. This arrangement insures positive rotation of the roller 53.

Means are provided to raise and lower the roller 53. The actuating mechanism comprises a link 55, rigidly secured to the shaft 48 adjacent the arm 49. The outer end of the link 55 is clevised, as indicated at 56, to a rod 57 which is connected to a foot treadle 58. The foot treadle is pivoted on a fulcrum 59. A spring 61, surrounding the rod 57 between a collar 62 and a bracket 63, normally maintains the roller 53 in spaced relation with respect to the roller 22, as shown in the drawings. When the treadle 58 is depressed, the rod 57 moves upwardly, causing the roller 53 to move downwardly and into contact with the roller 22.

A band of dry rubberized fabric to be cemented is placed over the rollers 22 and 38. The rollers 38 hold the band open, and out of contact with the roller 28 and basin 43. The inner edge of the band engages the annular flanges 39, which serve as guides. The rollers 38 may be adjusted, as mentioned above, to accommodate bands of different widths. The band is held in position, and is constrained to rotate over the rollers 22 and 38, by virtue of the pressure exerted by the roller 53. This roller is positively driven from the shaft 14, through the gears 31 and 54. If desired, the pressure roller 53 may be serrated or knurled, as an additional means of insuring rotation of the band.

The thickness of the coating to be applied to the band is determined by adjusting the clearance 29 between rollers 22 and 28. As the roller 28 revolves in the bath in the basin 43, it conveys to the roller 22 a coating of cement of a thickness substantially equal to the clearance between the rollers. The cement thus supplied to the roller 22 is in turn deposited upon the under side of the band, by the continued rotation of the parts. The pressure exerted by the roller 53 on the band is sufficient to insure a uniform deposition of the cement.

In operation, a band is placed over the rollers 22 and 38. The rollers 22 and 28 may be rotating when this is done, or the operator may start the machine after the band is in position. When the band is properly placed, the foot treadle 58 is depressed, forcing the roller 53 against the band, and causing it to rotate over rollers 22 and 38. One complete revolution of the band over the roller 22 is sufficient to apply a uniform coating of the desired thickness. When the band has made one revolution, the foot treadle 58 is released, permitting roller 53 to move upwardly, under the influence of the force exerted by the spring 61. The movement of the band over the roller 22 stops as soon as the pressure exerted by the roller 53 is removed. The band is then removed from the machine, and another dry band inserted in its place.

The machine provides a means for rapidly applying a uniform coating to the bands. The operation may be effected at a great saving of time over the old method of applying cement by means of a hand brush. Loss of material attending the old method is also avoided, and there is little likelihood of cement being applied to both sides of the band.

While the machine is particularly adapted to apply cement to dry bands employed in the fabrication of pneumatic tires, it is obvious that its utility is not limited to this process. It is also apparent that the construction described is susceptible of variations which will be apparent to those skilled in the art. It is not intended that the invention shall be limited to the specific illustration described and only such limitations should be imposed as are set forth in the following claims.

What I claim is:

1. A machine for applying cement to rubberized fabric bands comprising a frame having a drive shaft mounted thereon, a primary supporting roller secured to the shaft, a supplying roller disposed below the primary roller, a bearing support for the supplying roller suspended from the drive shaft, and additional supporting rollers mounted on the bearing support and disposed at either side of the primary supporting roller to hold the band in distended relation.

2. A machine for applying cement to rubberized fabric bands comprising a frame having a drive shaft journaled thereon, a primary supporting roller positioned on the shaft, a pressure roller movably mounted above the supporting roller, means associated with the supporting roller and the pressure roller to insure simultaneous rotation, a cement supplying roller suspended from the drive shaft, and auxiliary supporting rollers disposed at either side of the primary supporting roller, guide flanges on the auxiliary rollers, and means to adjust the position of the auxiliary rollers to accommodate bands of different widths.

In witness whereof, I have hereunto signed my name.

LAURENCE WETMORE.